United States Patent [19]

Somers Vine

[11] Patent Number: 4,940,261
[45] Date of Patent: Jul. 10, 1990

[54] PIPE COUPLINGS

[75] Inventor: John R. Somers Vine, Transvaal, South Africa

[73] Assignee: Dorbyl Light and General Engineering (Proprietary) Limited

[21] Appl. No.: 193,904

[22] Filed: May 13, 1988

[30] Foreign Application Priority Data

May 14, 1987 [ZA] South Africa ............. 87/3470

[51] Int. Cl.⁵ ............................................. F16L 17/04
[52] U.S. Cl. ..................................... 285/112; 285/373
[58] Field of Search ............. 285/112, 373, 367, 410, 285/419, 73; 24/279, 282, 284, 285

[56] References Cited

U.S. PATENT DOCUMENTS 3,709,526  1/1973  Cromie ................................. 285/73
4,373,235  2/1983  Korgaonkar ......................... 24/285
4,408,788  10/1983  Beukema ......................... 285/112 X
4,438,958  3/1984  DeCenzo ......................... 285/373 X
4,702,499  10/1987  deRaymond ..................... 285/373 X

FOREIGN PATENT DOCUMENTS 663140  5/1963  Canada ................................. 285/112

Primary Examiner—Dave W. Arola

[57] ABSTRACT

This invention relates to a pipe coupling and, in particular, to a Victaulic-type coupling which generally comprise a pair of half shells, together forming a sleeve which can be placed around adjacent flanged or grooved ends of a pair of pipes which have been located in co-axial end to end relationship for joining. The pipe coupling of the invention comprises a pair of discrete, substantially identical half shells which are engageable with one another to form a coupling sleeve. The half shells each include a hook formation on one end thereof which is interengagable with the hook formation of the other half shell, partly to secure the half shells to one another.

5 Claims, 3 Drawing Sheets

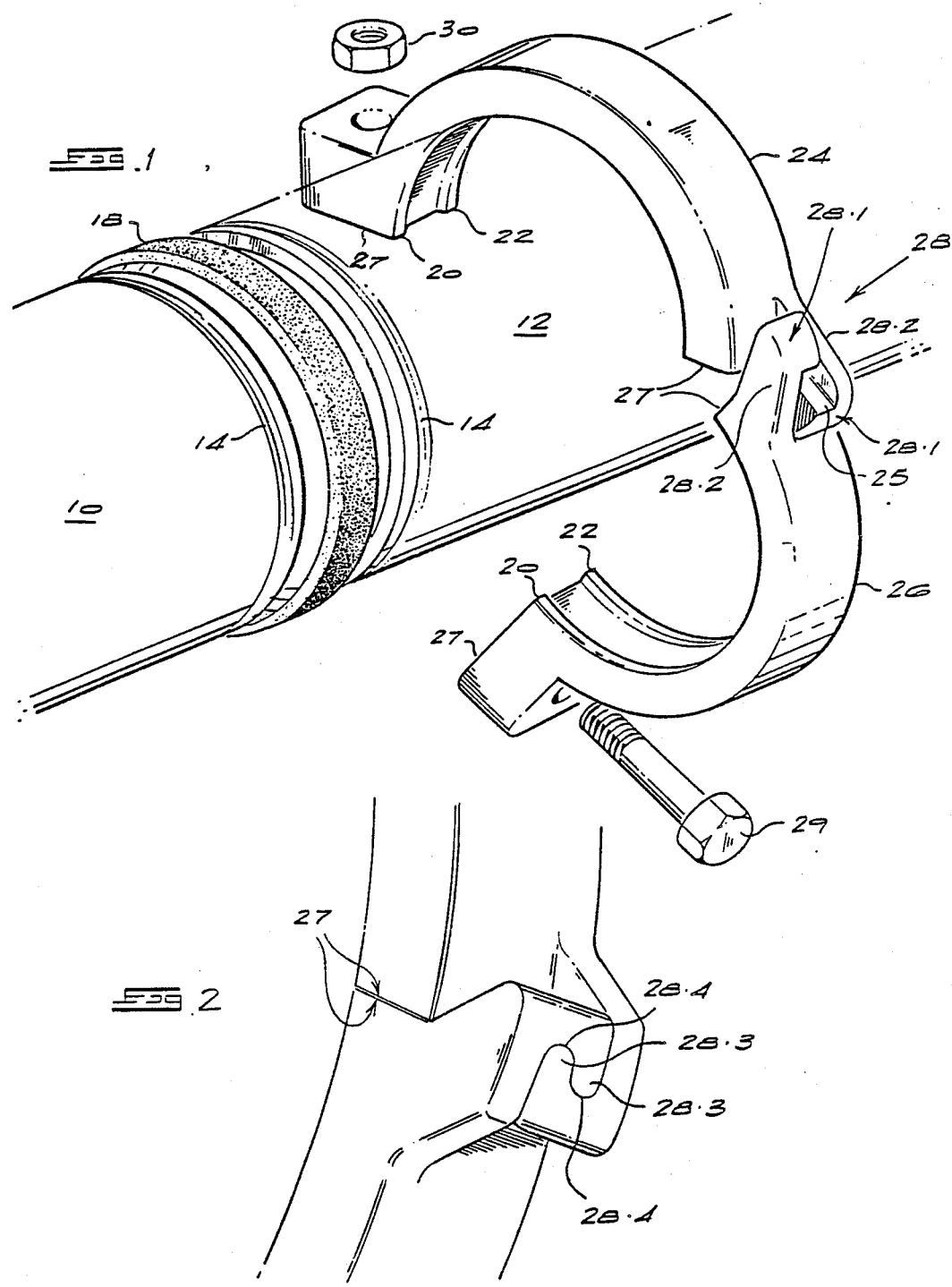

PIPE COUPLINGS

BACKGROUND OF THE INVENTION

THIS invention relates to a pipe coupling and, in particular, to a Victaulic-type coupling.

Victaulic couplings generally comprise a pair of half shells, together forming a sleeve which can be placed around adjacent shouldered or grooved ends of a pair of pipes which have been located in co-axial end to end relationship for joining. The half shells are formed with ridges which are adapted to fit into or around the formations on the pipe to secure the pipe ends together in a strong mechanical joint. A rubber sealing ring is located within a channel formed within the sleeve defined by the half shells, to provide a fluid tight joint.

In prior art Victaulic couplings, the half shells are provided with securement ends, constituted by radially projecting flanges which are formed with bolt holes through which bolts can be passed for fastening by means of nuts.

The problem with couplings of this type is that they frequently require more than one person to assemble, particularly in confined spaces, since, in essence, more than one pair of hands is needed to hold the two half shells together and to insert the bolts into the bolt holes.

Pipe couplings are known in which the half shells are interconnected or releasably interconnectable. U.S. Pat. No. 4,391,458—Blakeley Engineering Limited—describes a pipe coupling of the first kind in which the two half shells are hinged together at one pair of engagement flanges and intended for securement by means of a bolt and nut arrangement, at the opposed pair of engagement flanges.

UK Patent Application No. 2,161,882—Stanton and Staveley Limited—describes a variation on this format. In this patent, the half shells are hinged together on formations which, in essence, constitute a separable hinge, so that the half shells are separably interconnected. The interconnectability of the half shells overcomes the problem mentioned above, namely that of requiring two people to assemble the coupling on a pair of pipe ends, since the half shells, once interconnected on the hinge formation, are, at least, retained in position on the pipe ends. This means that a single person can manoeuvre the coupling and the pipe ends with one hand, while securing the half shells together with the bolt and nut, using the other hand.

However, this coupling comprises non-identical half shells, which leads to increased manufacturing and inventory costs.

An example of the use of identical half shells is described in U.S. Pat. No. 4,408,788—Grinell Fire Protection Systems Company, Inc.—in which the radially extending securement flanges are tapered to allow the half shells to swing open after the attachment, to one of the securement flanges, of the bolt and nut fastening.

This does not completely overcome the problems of the prior art, since the half shells are not readily disengagable in the open the position.

SUMMARY OF THE INVENTION

According to the invention a pipe coupling is provided for forming a pipe joint between adjacent ends of two pipes located in co-axial end to end relationship, the coupling comprising a pair of discrete, substantially identical half shells which are engagable with one another to form a coupling sleeve for complementally shaped pipe ends, the half shells each including a hook formation on one end thereof which is interengagable with the hook formation of the other half shell, partly to secure the half shells to one another.

In order to secure the half shells finally to one another to form a coupling sleeve, a bolt and nut or other fastening means may be used.

The pipe coupling is preferably a Victaulic coupling.

The hook formations are preferably shaped for the half shells to be pivotable relatively to one another through a predetermined pivot arc, which is conveniently determined such that the half shells, when interengaged with one another can pivot open sufficiently to fit over the pipe to be coupled.

The hook formations comprise, on each half shell, a radially outwardly projecting engagement flange, the free end of which is enlarged inwardly beyond the centre line of the pipe coupling, the engagement flange being recessed complementally, to accept the enlarged end on the engagement flange of the co-operating half shell.

In one form of the invention, the co-operating surfaces of the enlarged ends on the engagement flanges are axially plane, whereby the half shells may be separated axially in any permitted orientation of the half shells relatively to one another.

In a further form of the invention, the co-operating surfaces of the enlarged ends of the engagement flanges are formed with locking formations which, in certain orientations of the half shells relatively to one another, are interengagable to prevent the axial dislocation of the half shells.

The interlocking formations may be formed by complemental ribs and grooves formed either at the radially outer edges of the enlarged ends of the engagement flanges or, more conveniently, adjacent the pivot point of the two half shells.

The interlocking formations may be configured to allow dislocation of the two half shells only in the substantially open position of the half shells relatively to one another, as determined by the predetermined pivot arc of the half shells.

DESCRIPTION OF THE DRAWINGS

In the drawings:

FIG. 1 is an isometric view of a partly uncoupled Victaulic coupling according to one embodiment of the invention;

FIG. 2 is an isometric view on an alternative embodiment of the invention illustrating a different means of engagement for the half shells;

DESCRIPTION OF EMBODIMENTS OF THE INVENTION

Figure 3:
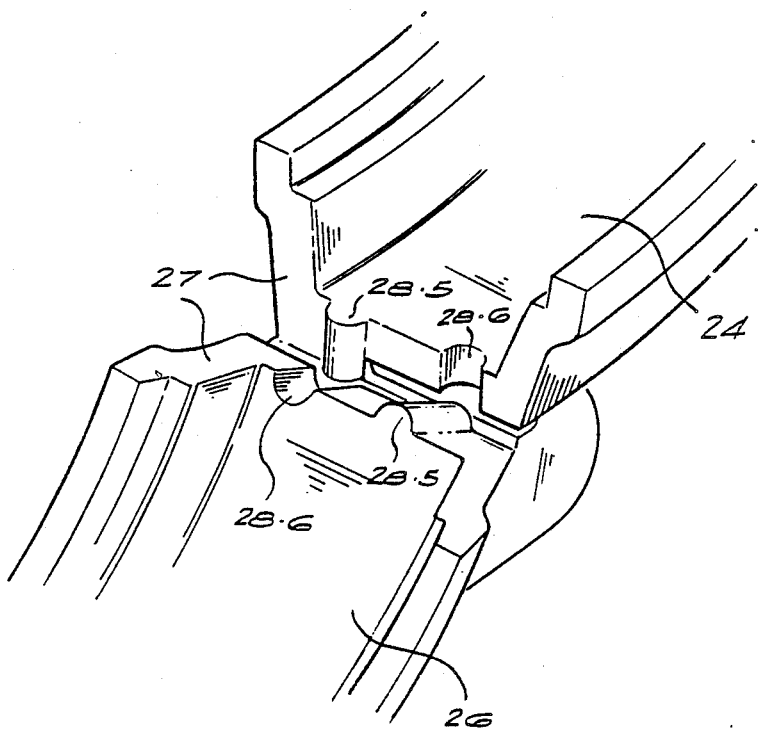
FIG. 3 is an isometric view on a further embodiment of the invention illustrating a different means of engagement for the half shells.

In FIG. 1, a pair of pipes 10 and 12 to be connected to one another are located co-axially in end to end relationship. The pipe ends are formed with Victaulic-type grooves or shoulders 14 and 16 which are dimensioned to accept the sides of a rubber sealing ring 18 and the edges of a pair of peripheral ridges 20 and 22 formed on a pair of half shells 24 and 26.

The half shells 24 and 26 are provided with interengagable hook formations 28.

The hook formations 28 are constituted by the enlarged ends 28.1 of radially outwardly projecting engagement flanges 28.2. The enlarged ends are provided with flat faces 25 which are co-planar with and opposed to the mating faces 27 of the half shells as can be seen from FIG. 5.

Figure 4:
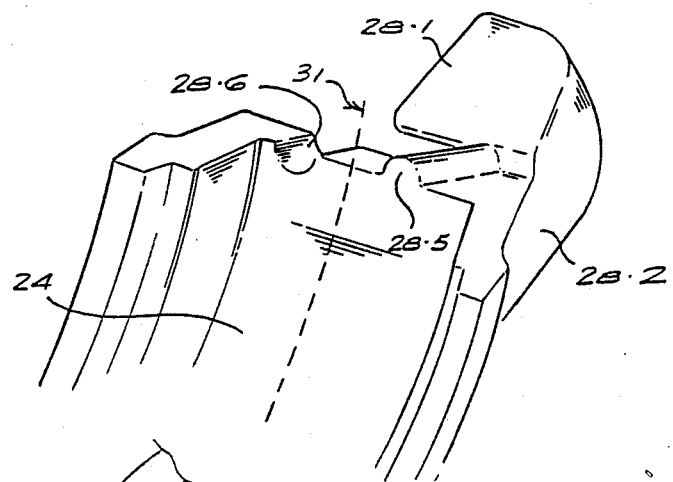
FIG. 4 is an isometric view on one half of the coupling of FIG. 3.
Figure 5:
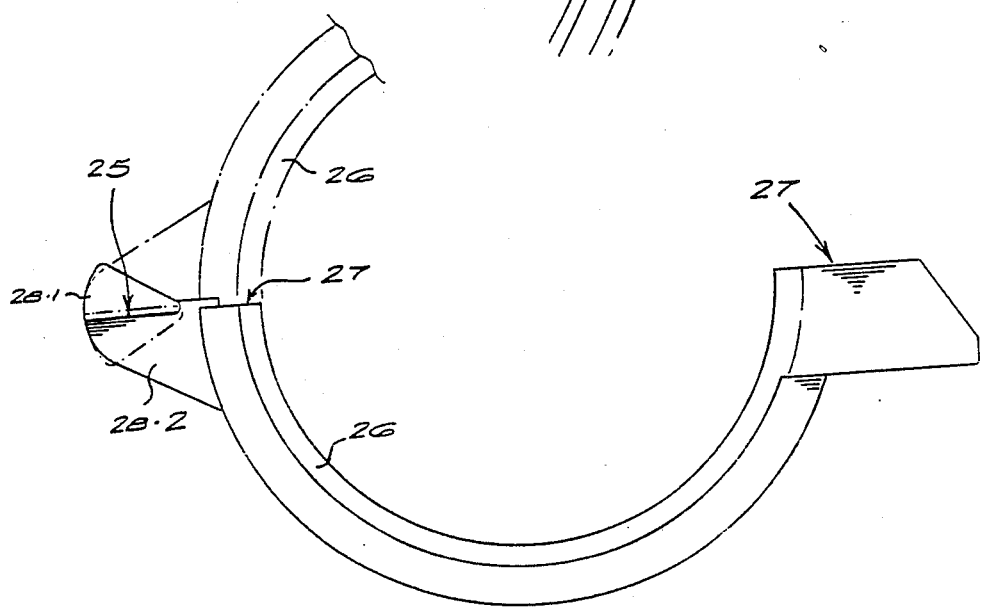
FIG. 5 is a side elevation on a half shell for the coupling of FIGS. 3 and 4.

As can be seen from FIGS. 1 and 4 in particular, the enlarged ends 28.1 extend axially inwardly towards the centre line 31 of each half shell, so that the flat faces of the enlarged ends 28.1 engage one another to hook the two half shells together. The engagement of the hook formations 28 is illustrated in FIG. 5 where the one half shell 24 is shown in side elevation and the half shell 26 engaged therewith is shown in dotted outline, also in side elevation.

The hook formations 28 are dimensioned to allow the half shells to pivot relatively to one another to the extent that the bolted ends of the half shells open sufficiently widely to allow the partly secured half shells 24 and 26 to fit over the diameter of the pipes 10 and 12. With the half shells 24 and 26 secured to one another across the interengagable hook formations 28, the person engaged in installing the pipe coupling has less loose elements with which to contend. The pipe coupling can therefore be made securely and relatively rapidly by one person.

To secure the half shells to one another, a bolt 29 and nut 30 are provided by means of which the open ends of the half shells 24 and 26 can be drawn towards one another for the ridges 20 and 22 to engage within the grooves 14 and 16, whereby the pipe joint is completed.

An alternative pair of hook formations is shown in FIG. 2. The flat engagement faces 25 of the enlarged ends 28.1 are each provided with an additional incurved lip on the radially outer edge thereof, the lips defining ribs 28.3 and grooves 28.4 which are adapted to interlock. By this means the lateral displacement of the half shells relatively to one another can be prevented in all but the substantially completely open position of the half shells. The advantage of this arrangement is that the half shells will not be separated inadvertently during storage or handling.

The embodiment shown in FIGS. 3 and 4 has the same advantage. In this arrangement a pair of nibs 28.5 are formed, one on each half shell 24, 26. A corresponding, complemental recess 28.6 is formed in each half shell opposite each nib 28.5. The nibs and recesses are provided adjacent the pivot point of the half shells. Upon interengagement of the nibs 28.5 and the recesses 28.6, the axial displacement of the half shells relatively to one another is likewise prevented.

I claim:

1. A pipe coupling for forming a pipe joint between adjacent ends of two pipes located in co-axial end-to-end relationship, the coupling comprising a pair of discrete, substantially identical half shells each including, on one end thereof, means mechanically to secure the half shells to one another to form a coupling sleeve for complementally shaped pipe ends and each half shell including, on the other end thereof, an L-shaped hook formation which is interengageable with the hook formation of the other half shell to complete the connection of the half shells to one another, each L-shaped hook formation comprising a leg which projects radially from the outer surface of the half shell and a base which is integral with the leg of the hook formation and which extends axially, relatively to the cylindrical axis of the half shell and inwardly beyond the transverse center line of the pipe coupling, the hook formations being adapted, upon engagement of the hook formations with one another, for the legs of the L-shaped hook formations to abut one another and the base of each L-shaped formation to engage the other hook formation by hooking over the leg part thereof and abutting, in opposed relationship, the base part thereof.

2. A pipe coupling according to claim 1 in which the hook formations are shaped for the half shells to be pivotable relatively to one another through a predetermined pivot arc, which is determined such that the half shells, when interengaged with one another, can pivot open sufficiently to fit over the diameter of the pipe to be coupled.

3. A pipe coupling according to claim 1 in which the base parts of the L-shaped hook formations are axially plane, the half shells being separable axially by dislocation of the half shells in a direction opposed to the direction of abutment of the hook formations, in any permitted orientation of the half shells relatively to one another.

4. A pipe coupling according to claim 1 in which the co-operating surfaces of the base parts of the L-shaped hook formations are formed with interengageable locking formations which, in certain orientations of the half shells relatively to one another, are interengageable to prevent the axial dislocation of the half shells, the interengageable locking formations being constituted by complemental ribs and grooves formed in axially plane mating faces of the base parts of the L-shaped hook formations.

5. A pipe coupling according to claim 1 in which the co-operating surfaces of the base parts of the L-shaped hook formations are formed with interengageable locking formations which, in certain orientations of the half shells relatively to one another, are interengageable to prevent the axial dislocation of the half shells, the interengageable locking formations being constituted by complemental nibs and grooves formed in axially plane mating faces of the based parts of the L-shaped hook formations, adjacent the point of contact of the two half shells which, in use is adapted to serve as a pivot point, the interengageable locking formations being configured to allow dislocation of the two half shells only in the substantially fully open position of the half shells relatively to one another, as determined by a predetermined pivot arc of the half shells.

* * * * *